United States Patent [19]
Sallas

[11] Patent Number: 4,918,668
[45] Date of Patent: * Apr. 17, 1990

[54] MARINE VIBRATOR TUNEABLE ARRAY

[75] Inventor: John J. Sallas, Plano, Tex.

[73] Assignee: Halliburton Geophysical Services, Inc., Houston, Tex.

[ * ] Notice: The portion of the term of this patent subsequent to Feb. 2, 2005 has been disclaimed.

[21] Appl. No.: 304,786

[22] Filed: Jan. 30, 1989

[51] Int. Cl.$^4$ .............................................. G01V 1/38
[52] U.S. Cl. ....................................... 367/22; 367/23; 367/138; 367/905
[58] Field of Search .................... 367/21, 22, 23, 103, 367/138, 905

[56] References Cited

U.S. PATENT DOCUMENTS

| | | | |
|---|---|---|---|
| 4,132,974 | 1/1979 | Mollere | 367/15 |
| 4,163,206 | 7/1979 | Hall, Jr. | 367/160 |
| 4,345,473 | 8/1982 | Berni | 73/516 LM |
| 4,476,553 | 10/1984 | Ziolkowski et al. | 368/144 |
| 4,483,411 | 11/1984 | Mifsud | 181/120 |
| 4,486,865 | 12/1984 | Ruehle | 367/24 |
| 4,616,352 | 10/1986 | Sallas et al. | 367/190 |
| 4,618,949 | 10/1986 | Lister | 367/171 |
| 4,705,137 | 11/1987 | Fair | 181/120 |
| 4,709,356 | 11/1987 | Ayers | 367/19 |
| 4,721,180 | 1/1988 | Haughland et al. | 181/111 |
| 4,723,231 | 2/1988 | Sallas | 367/189 |
| 4,727,956 | 3/1988 | Huizer | 181/111 |
| 4,730,692 | 3/1988 | Fair et al. | 181/114 |
| 4,739,858 | 4/1988 | Dragoset, Jr. | 181/115 |
| 4,752,916 | 6/1988 | Loewenthal | 367/24 |
| 4,780,860 | 10/1988 | Sasakura et al. | 367/103 |

OTHER PUBLICATIONS

Sallas, J. J., "Source-Tunable Array for Ground-Roll Reduction", presented at the 57th Annual Meeting of the SEG, Oct. 11-15, 1987.

Primary Examiner—Charles T. Jordan
Assistant Examiner—Woodrow J. Eldred
Attorney, Agent, or Firm—Thomas R. Weaver; Steven P. Arnold

[57] ABSTRACT

A method of reducing horizontally propagating pressure waves in marine seismic exploration improves the signal-to-noise ratio at associated receivers and reduces interference at unassociated receivers. Marine vibrators are arranged into an array with a given separation between each vibrator, so that horizontally propagating pressure waves from the vibrators which generally traverse the array are out-of-phase at most frequencies of vibration. The amplitude output from each vibrator varies with the output frequency of each vibrator to maximize the cancellation of out-of-phase pressure waves along the array. A receiver, which usually includes a plurality of hydrophones disposed in a streamer, is spaced from the marine vibrators at a distance sufficient to establish the receiver as being in the far-field. The output of each of the marine vibrators is locked in phase and frequency with a known pilot signal so that downwardly propagating pressure waves are substantially unaffected. The overall effect is a narrowing of the radiation pattern of the pressure waves. The resulting radiation pattern effectively directs pressure waves downwardly toward an underwater land formation, and reduces horizontally propagating pressure waves which normally result in interference with marine seismic receivers.

13 Claims, 1 Drawing Sheet 4,918,668

MARINE VIBRATOR TUNEABLE ARRAY

BACKGROUND OF THE INVENTION

1. Field of the Invention

This invention relates generally to marine seismic exploration, and more particularly to the suppression of pressure waves which propagate in undesirable directions.

2. Description of the Related Art

In marine seismic exploration, a seismic survey ship is equipped with an energy source and a receiver for taking seismic profiles of an underwater land configuration. The action of taking profiles is often referred to as "shooting," due to the fact that explosive devices where commonly used for many years as energy sources. Normal production shooting takes place while the survey ship is moving at a constant speed, and can produce over 1000 profiles per day.

The energy source is designed to produce compressional (pressure) or P-waves that propagate through the water and into the underwater land formation, so that reflected energy can be received and processed into an image which provides information about the structure of the subterranean formation. Presently, one of the most common energy sources is an air gun which discharges air under very high pressure into the water. The discharged air forms a bubble which oscillates at a frequency within the seismic range. Another energy source which is frequently used is a marine vibrator. Marine vibrators typically include a pneumatic or hydraulic actuator which causes an acoustic piston to vibrate at a selected frequency. The vibrations of the acoustic vibrator produce pressure differentials in the water which generate seismic pulses free from spurious bubbles. Environmentalists prefer marine vibrators over air guns and explosives because the latter are harmful to marine life.

The receivers in marine applications are typically referred to as hydrophones. The hydrophones convert pressure waves into electrical signals which are used for analog or digital processing. The most common type of hydrophone is of the piezoelectric type. The hydrophones are mounted on a long streamer which is towed behind the survey ship at a depth of about 30 feet. A problem arises in that the energy sources, which are typically operated at similar depth, generate pressure waves that propagate radially outward. Therefore, the hydrophones receive horizontally propagating energy directly from the energy sources as well as energy reflected from the underwater land formation. This horizontally propagated energy interferes with the reception and analysis of the reflected energy.

The energy that is propagated in a horizontal direction relative to the energy sources is picked up not only by the receivers associated with the exploration platform that is generating the energy, but also by the receivers associated with other marine seismic exploration crews in the area. Thus, crews often must plan marine seismic operations so as to minimize interference. This is of particular concern in tee Gulf of Mexico and the North Sea.

Much work has been done in the design of air gun source arrays. The extended array described by Huizer (U.S. Pat. No. 4,727,956) describes an airgun array which is wide. Through proper selection of spacing and gun size his array could be designed to provide attenuation of horizontally propagating compressional wave energy at the upper end of the seismic frequency band. Most other work with marine source arrays has been devoted to spectral shaping of the downgoing wavelet (Dragoset, U.S. Pat. No. 4,739,858, etc.).

Other effort has been expended to reduce the receiver sensitivity to horizontally propagating energy. Most streamers in use today have receiver groups comprised of hydrophones. The hydrophones in common use are piezoelectric devices responsive to fluid pressure changes. They are omnidirectional transducers. An array of hydrophone elements is most often formed within the streamer, the array being usually comprised of evenly spaced elements. Some rejection of a wavefront propagating in the direction of the hydrophone array length will be realized. No rejection of broadside noise is possible for this case. Another method for achieving some rejection of horizontally propagating energy is to employ particle motion detectors (geophones or accelerometers). A geophone is a device responsive to particle velocity. Common single element geophones are of a moving coil construction and have a low cross-axis sensitivity. Use of such devices in a streamer requires gimble mounting to keep the geophones vertically oriented within the streamer as it twists. The gimbled geophones are therefore only sensitive to vertical motion and would tend to be insensitive to horizontal propagating energy. Gimbled geophones have many disadvantages: among them being cost and reliability. Recent patents for self-orienting geophones/accelerometers include: U.S. Pat. No. 4,345,473 and U.S. Pat. No. 4,618,949.

Signal processing is employed to provide further enhancement of the seismic reflections. Velocity filtering, and common-depth-point stacking are steps in the processing sequence which can be used to provide some additional suppression of horizontally propagating energy. While they can provide additional improvement in the signal-to-noise ratio, even greater improvement could be achieved when used in combination with data acquisition methods which suppress energy coming from outside the plane of interest.

The present invention is directed to overcoming one or more of the problems as set forth above.

SUMMARY OF THE INVENTION

It is the primary object of the present invention to reduce interference between marine seismic explorations.

It is an important object of the present invention to direct energy from marine vibrators in selected directions in accordance with the primary objective.

It is another object of the present invention to direct the majority of energy produced by marine vibrators downwardly.

It is yet another object of the present invention to suppress energy from marine vibrators which propagates in a direction other than downwardly.

It is still another object of the present invention to suppress the majority of energy from marine vibrators which propagates outwardly while suppressing relatively little energy from marine vibrators which propagates downwardly.

It is a further object of the present invention to improve the signal-to-noise ratio at receivers associated with the respective marine vibrators.

It is a still further object of the present invention to reduce the amount of unreflected energy transmitted to the receivers from the marine vibrators.

According to the present invention, the amplitude of vibrations produced by each vibrator in an array is controlled in relation to the frequency of the vibrations to suppress pressure waves propagating in a substantially horizontal or outward direction. An algorithm is used to calculate the amplitude versus frequency function for each vibrator in the source array. The vibrators in the array are operated in phase synchronization with one another, so that the downwardly propagating pressure waves are not suppressed. The separation between the vibrators in the array cause outwardly propagating pressure waves from at least one vibrator to be out-of-phase with the outwardly propagating pressure waves of at least one other vibrator. For instance, if two outwardly propagating pressure waves are of equal amplitude and 180 degrees out-of-phase they will completely cancel each other. The pressure wave radiation pattern for the marine vibrator array is thereby altered.

This alteration in the pressure wave radiation pattern reduces the amount of unreflected energy which is transmitted to receivers associated with the vibrator array. For instance, application of the invention to an array which includes a plurality of marine vibrators arranged collinearly reduces pressure waves which propagate horizontally out of the ends of the array. Since the streamer is towed behind one end of the collinear array, the energy of pressure waves received directly from the vibrators (i.e., unreflected energy) is reduced. To reduce horizontally propagating pressure waves in all directions, a plurality of marine vibrators are arranged in two concentric rings. Since the pressure waves which propagate radially outwardly from the concentric rings are substantially reduced, interference of receivers used by other seismic exploration crews in the area is reduced.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENT

Figure 1:
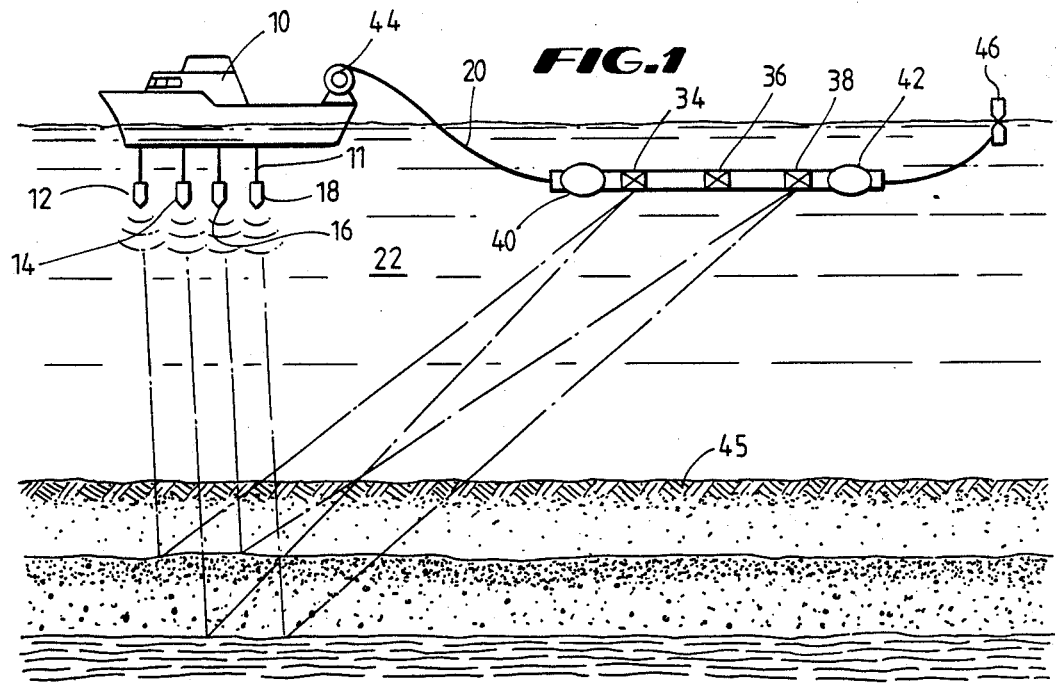
FIG. 1 illustrates a seismic survey ship with marine vibrators and receivers.
Figure 2:
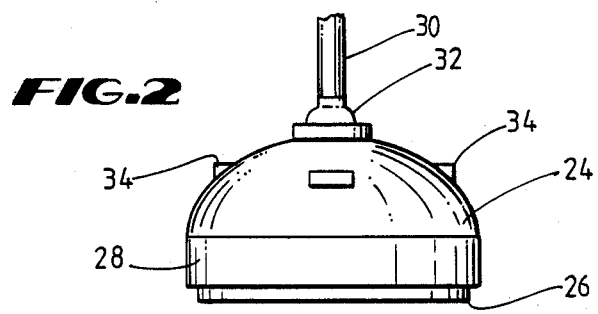
FIG. 2 illustrates a marine vibrator.

Referring initially to FIGS. 1 and 2, a seismic survey ship 10 utilizes a plurality of vibration sources, such as marine vibrators 12, 14, 16, 18, and a streamer 20 for seismic exploration beneath a body of water 22. The marine vibrators 12, 14, 16, 18 are preferably hydraulically actuated. FIG. 2 illustrates an exemplary marine vibrator 24 having an acoustic piston 26 which is hydraulically coupled to a hydraulic piston (not shown) within a housing 28. A hydraulic line 30 provides fluid from a ship-board hydraulic pump (not shown) to the hydraulic piston via a coupling 32. For suspension in the water, a plurality of flanges 34 are provided on the housing 28 so that cables 11 can be connected between the vibrator 24 and the ship 10. The diameter of the vibrator 24 is much less than the wavelength of the vibrations produced, and, therefore, the vibrations produce compressional waves or P-waves which radiate spherically from each vibrator. A marine vibrator source, such as those produced by Industrial Vehicle International, Inc., have been shown to have a radiation directivity pattern over the seismic band which looks very much like that of a point source and are preferred in the inventive system.

The streamer 20 contains a plurality of hydrophones, which are arranged in sections 34, 36, 38 along the length of the streamer 20. The hydrophones receive energy imparted to the water by the vibrators 12, 14, 16, 18. The depth of the streamer is controlled by a plurality of depth controllers 40, 42 which are clamped over the streamer 20. When in use, the streamer 20 extends between a ship-board reel 44 and a buoy 46. Visual or radar sighting on the buoy 46 is used to determine the amount of drift of the streamer 20, and is also used to locate the streamer 20 in case of accidental breakage. When not in use, the streamer 20 is stored on the ship-board reel 44.

The hydraulic actuation of the acoustic piston of each of the vibrators is controlled by an electronic control (not shown). The electronic control causes the vibrators 12, 14, 16, 18 to change frequency in a controlled fashion. For instance, the frequency output of each of the vibrators can sweep from 10 Hertz to 190 Hertz in 14 seconds. A suitable control synchronizes the phase of each vibrator to the phase of a pilot signal. This is accomplished by placing a hydrophone in close proximity to each vibrator to produce a feedback signal. The electronic control adjusts the signal used to drive the hydraulic piston until the feedback signal is in phase with the pilot signal. A method for closed loop amplitude control of a seismic vibrator is described in U.S. Pat. No. 4,616,352 to Sallas et al.

An alternative feedback signal could be obtained by monitoring the actuator force developed by the source. This actuator force could be measured through the use of two pressure transducers, one transducer installed to measure the hydraulic pressure applied to each face of the actuator piston. The difference of the transducer voltages is a signal proportional to the actuator force being applied to the vibrator. If all vibrators are of similar design and see the same radiation impedance (i.e., same water environment) control of this signal will also ensure the vibrators are operated in synchronization.

Since all of the vibrators are disposed at a predetermined depth, such as 30 feet, the vibrations from each vibrator 12, 14, 16, 18 which are traveling downwardly toward a formation 45 are in phase with one another. However, as previously mentioned, each vibrator produces a spherical wavefront. Therefore, P-waves travel outwardly in the water as well as downwardly.

To reduce the energy of the horizontally travelling P-waves, the vibrators 12, 14, 16, 18 are selectively spaced apart from one another and the amplitude of the vibrations from each vibrator is varied with frequency so that horizontally travelling P-waves partially or fully cancel before they reach the hydrophone receivers. The separation between each vibrator 12, 14, 16, 18 is selected so that waves travelling horizontally outwardly from one vibrator are out of phase with waves travelling horizontally outwardly from another vibrator.

Therefore, the approximate velocity at which P-waves travel in water should be known in order to calculate the separation between the vibrators for phase cancellation. The velocity of P-waves in water can be found in tables, such as in the Handbook of Chemistry and Physics. This would be the velocity of sound in sea water and is approximately 5000 feet per second. If the frequency of the vibrators did not change, the separation between each vibrator would be about one-half wavelength so that waves travelling horizontally outwardly from the vibrators would be 180 out-of-phase. If the amplitude of the out-of-phase waves are equal, the waves cancel. However, the frequency is not constant, but instead is swept over a range of frequencies in order to increase the resolution between reflections from the formation. Therefore, the separation between the vibrators and the amplitude of each vibrator are selected to provide maximum suppression of horizontally travelling P-waves over the range of frequencies in the sweep.

Figure 3:
FIG. 3 schematically illustrates a positional relationship for the vibrators and the receiver in accordance with the present invention.
Figure 3:
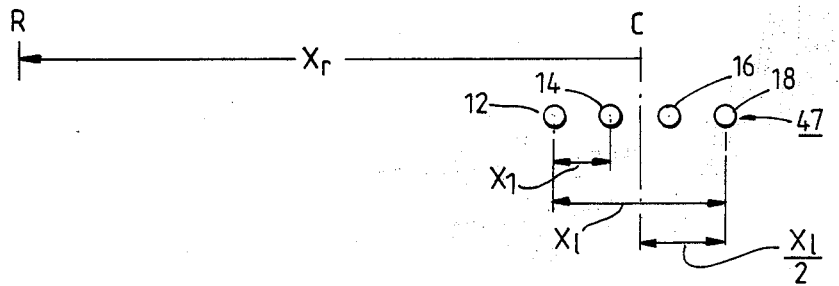

FIG. 3 schematically illustrates the positional relationship of the vibrators 12, 14, 16, 18 in a collinear array 47 and, in this preferred embodiment, having equal separations designated by $X_1$. A receiver R, i.e., the streamer with hydrophones, is located at a distance $X_r$ from the center point C of the linear array 47. Since the receiver R is located a distance from the vibrators 12, 14, 16, 18 that is more than twice the wavelength of the lowest frequency to be used in the sweep, the receiver R is located in the far-field, and, thus, the spherical waves received by the receiver R appear to be plane waves.

The objective is to suppress pressure waves over a particular range of frequencies which, in this preferred embodiment, is about 10 Hz to 40 Hz. The following algorithm provides a solution for the maximum suppression of P-waves which travel outwardly as opposed to downward from the vibrator array 47 and generally along the line formed by the vibrators 12, 14, 16, 18. The configuration of the array 47, when optimized according to the algorithm, has the effect of directing P-wave energy downwardly and along the sides of the array 47 to produce a "radiation" pattern with little P-wave radiation out of the ends of the array 47. To ensure that the apparent center C of the array 47 (between units 14 and 16 of FIG. 3) is frequency invariant, let a(f) be the force output weighting factor of the outer vibrators 12 and 18, and let b(f) be the force output weighting factor of the inner vibrators 14, 16. The force output weighting factors a(f) and b(f) are dependent upon the frequency of the vibrations and determine the amplitude of the vibrations from the vibrators. The force output weighting factors are varied to provide maximum cancellation of horizontally propagating P-waves.

Then at frequency f:

$$R(t,f) = k(f) \left[ a\cos\left( 2\pi ft - \frac{2\pi f}{c}\left( X_r - \frac{3X_1}{2} \right)\right) + b\cos\left( 2\pi ft - \frac{2\pi f}{c}\left( X_r - \frac{X_1}{2} \right)\right) + b\cos\left( 2\pi ft - \frac{2\pi f}{c}\left( X_r + \frac{X_1}{2} \right)\right) + a\cos\left( 2\pi ft - \frac{2\pi f}{c}\left( X_r + \frac{3X_1}{2} \right)\right) \right] \quad (1)$$

where k(f) is an attenuation constant, c is approximately 5000 feet per second, the speed of sound in sea water, $X_1$ is the distance between vibrators as in FIG. 3, and $X_r$ is the distance between the receiver R and the center point C of the in-line array of vibrators.

Letting $q=a/b$, where b is not equal to 0, equation (1) may be simplified and transformed to the following equation in which r'(f) is proportional to R(t,f) by a constant of attenuation and absolute amplitude:

$$r'(f) = 2\cos\frac{\pi f X_1}{c}\left( (1 - 2\cos(2\pi f X_1))q - 1 \right) \quad (2)$$

By setting r'(f)=0 and solving for q and $X_1$, no horizontally propagating P-wave would be measured at the receiver R. Because of practical limitations the range of solutions for q is limited; q must be greater than or equal to ⅓ and less than or equal to 3.0. Negative values for q are not allowed since that would require two vibrators to be 180 out-of-phase with the other two vibrators. This is an undesirable combination since it would also greatly reduce the downgoing P-wave energy. Also, it is undesirable to let one or more vibrators vibrate at less than approximately 25% of their rated capacity due to the possibility of losing synchronization of the vibrators with one another, and with the pilot or reference signal. Moreover, the vibrators should not be vibrated into a non-linear region of response (i.e., more than 100% of rated capacity).

Setting equation (2)=0;

$$q = \frac{1}{1 - 2\cos\frac{2\pi f X_1}{c}} \quad (3)$$

By solving for $X_1$ in equation (3) the distance between vibrators can be calculated. For this calculation, let q=3.0 which represents the maximum ratio of amplitude a to amplitude b. Also, let f equal the lowest frequency that will be used in the sweep; in this case f=10 Hz. With c=5000 ft/sec. we have:

$$3.0 = \frac{1}{1 - 2\cos\frac{2\pi(10)X_1}{5000}}$$

which upon solving for $X_1$ yields the result approximately 98 ft.

If a flat downgoing P-wave power spectrum is desired as shown in this preferred embodiment, the sum of the contributions of each element of the array 47 must be constant with frequency, as shown by the following equations:

$$a + b = k' \text{ but } q = a/b. \text{ Then } a = \frac{qk'}{1 + q} \text{ and } b = \frac{k'}{1 + q}$$

The values for a and b are determined by evaluating equation (3) for each frequency in the sweep after fixing the values of the other variables $X_1$ and c.

In addition to the resultant total compressive force remaining constant, this preferred embodiment also illustrates identical amplitudes from the pairs of vibrators. It should be evident that each vibrator 12, 14, 16, 18 may be tuned to provide a different force output, and the individual separations may be changed. The constant total force output may also be changed. For example, a total force which increases directly with frequency could be implemented to enhance high frequency output.

Figure 4:
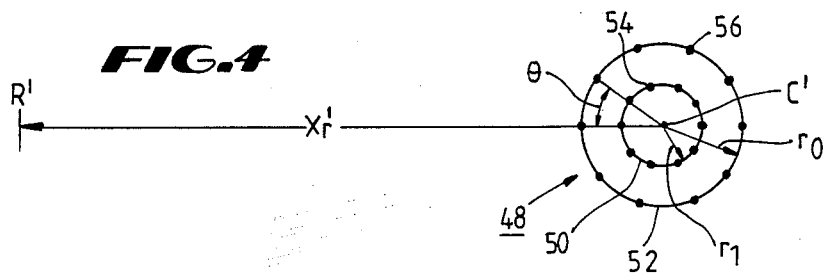
FIG. 4 schematically illustrates an alternate position for the vibrators and the receiver in accordance with the present invention.

To obtain suppression of P-waves which travel outwardly in all horizontal directions from a vibrator array, a plurality of vibrators (point sources) are formed into two concentric "rings" so that they approximate "ring sources." Such an array when optimized according to the algorithm, has the effect of directing the majority of the P-wave energy downwardly to form a "radiation" pattern having a main, downwardly directed lobe. This preferred array configuration is shown schematically in FIG. 4 where each ring 50, 52 contains ten vibrators, generally designated by reference numerals 54 and 56, respectively. Each of the vibrators 54, 56 is preferably equidistant from adjacent vibrators in the respective rings, and each adjacent vibrator is angularly separated by an angle $\theta$, that is, 36° apart. In marine applications where it is desirable for a plurality of seismic crews to function in a relatively small area, the vibrator array 48 suppresses horizontally propagating P-waves in all directions, so that the vibrators used by one seismic survey crew do not interfere with the receivers, i.e., streamers, of the other seismic crews. In this preferred embodiment, the vibrator array 48 and the frequency-variant amplitude function for maximum suppression of horizontally travelling P-waves over a range of 0° to 360° is derived according to the following calculations. The outer ring 52 has a radius of $r_0$ and the inner ring 50 has a radius of $r_1$.

The amplitude of the outer ring 52 of radius $r_0$ is:

$$\frac{a}{2\pi r_0}$$

The amplitude of the inner ring 50 of radius $r_1$ is:

$$\frac{b}{2\pi r_1}$$

The receiver R' is located at distance $X'_r$ from the center C'. The contribution of the outer ring 52 to the P-wave received by the receiver R' is given by:

$$I_1 = \int_0^{2\pi} \frac{ak}{2\pi r_0} \cos\left(2\pi ft - \frac{2\pi f}{c}(X'_r - r_0 \cos\theta)\right) d\theta$$

Through mathematical reduction, $$I_1 = \frac{ak}{r_0} \cos\left(2\pi ft - \frac{2\pi f X'_r}{c}\right) J_0 \frac{(2\pi f r_0)}{c}$$

where $J_0(f)$ is a bevel function of the first kind of order zero.

Similarly, the contribution of the inner ring 50 to the P-wave received at the receiver R' is:

$$I_2 = \frac{bk}{r_1} \cos\left(2\pi ft - \frac{2\pi f X'_r}{c}\right) J_0 \frac{(2\pi f r_1)}{c}$$

For the P-wave to be suppressed at the receiver R', amplitudes "a", the amplitude of the outer vibrators 56, and "b", the amplitude of the inner vibrators 54, must be selected so that the sum of $I_1$ and $I_2$ is minimized. For complete suppression, the sum of $I_1$ and $I_2$ must be zero for arbitrary values of "t". With these conditions:

$$\frac{a}{b} = \frac{-r_0\left(J_0 \frac{(2\pi f r_1)}{c}\right)}{r_1\left(J_0 \frac{(2\pi f r_0)}{c}\right)}$$

The magnitudes of "a" and "b" are constrained as in the previously described linear array 47. For a flat output, the sum of "a" and "b" is a constant. Also, q=a/b, and q is equal to or greater than $\frac{1}{3}$ or equal to or less than 3.0. Values for $J_0(f)$ are available in tables such as found in "Handbook of Chemistry and Physics."

While specific embodiments of this invention have been shown, it is understood that those skilled in the art may readily vary distances, amplitudes, and numbers of vibrators and receivers without departing from the scope of this invention which is limited only by the appended claims.

What is claimed is:

1. A method of reducing pressure waves in marine seismic exploration propagating substantially horizontally from an array of marine vibrator sources wherein a plurality of marine vibrator sources are spaced from each other by known separations and at least one receiver is employed, each vibrator producing an output signal having given phase, frequency and amplitude, comprising the steps of:
   (a) establishing a spacing between said plurality of marine vibrators and said receiver sufficient to establish said receiver as being in the far-field;
   (b) locking the output signal of each of said marine vibrator sources in phase and frequency to a known reference phase and to a known reference frequency, respectively;
   (c) maintaining the known separations between said marine vibrators;
   (d) varying the known reference frequency over a range of discrete frequencies; and
   (e) varying the individual output amplitude of each marine vibrator at the discrete frequencies so that the resultant pressure waves traverse the known separations resulting in phase shifts which diminish the resultant amplitude of the pressure waves received by said receiver correlative to the output amplitude of the individual marine vibrators and the pressure wave velocity.

2. The method of claim 1 wherein the known separations are equal in distance.

3. The method of claim 1 wherein the step of varying the individual output amplitudes comprises the step of adjusting the individual output amplitude of each marine vibrator to provide a composite output from said plurality of marine vibrators having a constant amplitude for each of the discrete frequencies.

4. The method of claim 1 further comprising the step of positioning said plurality of marine vibrators in a straight line that essentially bisects said receiver.

5. The method of claim 4 wherein,
said plurality of marine vibrators comprise two inner marine vibrators and two outer marine vibrators; and
said step of varying the individual output amplitude of each marine vibrator comprises the step of adjusting the amplitudes of the two outer vibrator sources to be equal to each other and the amplitudes of the two inner vibrator sources to be equal to each other.

6. The method of claim 1 further including the step of positioning a first portion of said plurality of marine vibrators in an inner circle of a first preselected radius and positioning a second portion of said plurality of marine vibrators in a concentric outer circle of a second preselected radius.

7. The method of claim 3 further including the step of positioning a first portion of said plurality of marine vibrators in an inner circle of a first preselected radius and positioning a second portion of said plurality of marine vibrators in a concentric outer circle of a second preselected radius.

8. The method of claim 7 further comprising the step of equally spacing said marine vibrators in the outer circle and equally spacing said marine vibrators in the inner circle.

9. The method of claim 8 wherein the step of varying the individual output amplitude comprises the step of adjusting the amplitudes of each of said marine vibrators in the outer circle to be equal to each other and the amplitudes of each of said marine vibrators in the inner circle to be equal to each other.

10. A method of reducing pressure waves propagating substantially horizontally from an array of marine vibrators wherein a plurality of marine vibrators are spaced from each other by known separations and at least one receiver is employed, each vibrator producing an output signal having given phase, frequency and amplitude, comprising the steps of:
 (a) establishing a spacing between four of said plurality of marine vibrators and said receiver sufficient to establish said receiver as being in the far-field, said marine vibrators being positioned in a straight line that essentially bisects the receiver, said four marine vibrators being comprised of two outer vibrators and two inner vibrators with respect to their positioning along said straight line;
 (b) locking the output signal of each of said marine vibrators in phase and frequency to a known reference phase and to a known reference frequency, respectively;
 (c) maintaining the known separations between said marine vibrators;
 (d) varying the known reference frequency over a range of discrete frequencies; and
 (e) adjusting the amplitudes of the two outer marine vibrators and the amplitudes of the two inner marine vibrators, and a distance $X_1$ in the following algorithm to minimize the pressure wave at the receiver:

$$\frac{a}{b} = \frac{1}{1 - 2\cos\frac{2\pi f X_1}{c}}$$

wherein:
a = amplitude of the two outer marine vibrators,
b = amplitude of the two inner marine vibrators,
c = velocity of the pressure waves, approximately 5000 ft./sec.,
f = a discrete frequency, and
$X_1$ = a known separation between two vibratory sources.

11. The method of claim 10 wherein the amplitudes a and b may not be adjusted to less than approximately 0.25 maximum amplitude.

12. A method of reducing pressure waves propagating substantially horizontally from a plurality of marine vibrators spaced from each other by known separations wherein at least one receiver is employed, each vibrator producing an output signal having given phase, frequency and amplitude, comprising the steps of:
 (a) positioning and equally spacing a first portion of said plurality of marine vibrators to form a first circle having a first radius;
 (b) positioning and equally spacing a second portion of said plurality of marine vibrators to form a second circle being concentric with said first circle and having a second radius which is greater than said first radius, whereby said circles share a common center;
 (c) establishing a spacing between said common center and said receiver sufficient to establish said receiver as being in the far-field;
 (d) locking the output signal of each of said marine vibrators in phase and frequency to a known reference phase and to a known reference frequency, respectively;
 (e) maintaining the known separations between the marine vibrators;
 (f) varying the known reference frequency over a range of discrete frequencies; and
 (g) varying the individual output amplitude of each marine vibrator at the discrete frequencies so that the resultant pressure waves traverse the known separations resulting in phase shifts which diminish the resultant amplitude of the pressure waves travelling radially outwardly from said concentric circles by adjusting the amplitudes of the marine vibrators in said first circle and the amplitudes of the marine vibrators in said second circle and the radii of the two circles of vibrators in the following algorithm to minimize pressure waves which propagate radially outwardly from said concentric circles:

$$\frac{a}{b} = \frac{-r_0 \left( J_o \frac{(2\pi f r_1)}{c} \right)}{r_1 \left( J_o \frac{(2\pi f r_0)}{c} \right)}$$

wherein:
a = amplitude of the marine vibrators in the second circle,
b = amplitude of the marine vibrators in the first circle,
$r_0$ = radius of the second circle,
$r_1$ = radius of the first circle,
c = velocity of the pressure waves,
f = a discrete frequency, and
$J_o(f)$ = a bessel function.

13. The method of claim 12 wherein said first portion of marine vibrators include ten marine vibrators which are angularly spaced from one another by equal distances, and said second portion of marine vibrators include ten marine vibrators which are angularly spaced from one another by equal distances.

UNITED STATES PATENT AND TRADEMARK OFFICE
CERTIFICATE OF CORRECTION

PATENT NO. : 4,918,668

DATED : April 17, 1990

INVENTOR(S) : John J. Sallas

It is certified that error appears in the above-identified patent and that said Letters Patent is hereby corrected as shown below:

Column 1, line 61, delete "tee Gulf" and insert --the Gulf--
Column 1, line 15, delete "where" and insert --were--
Column 7, line 65, delete "bevel" and insert "bessel"
Column 6, line 4, delete:

"$a\cos(2\pi ft - \frac{2\pi f}{C}(X_r + \frac{3X}{2}1))] + $"

and insert:

-- $a\cos(2\pi ft - \frac{2\pi f}{C}(X_r + \frac{3X}{2}1))]$ --

UNITED STATES PATENT AND TRADEMARK OFFICE
CERTIFICATE OF CORRECTION

PATENT NO. : 4,918,668

DATED : April 17, 1990

INVENTOR(S) : John J. Sallas

It is certified that error appears in the above-identified patent and that said Letters Patent is hereby corrected as shown below:

Column 7, line 55 delete:

$$`` I_1 = \int_0^{2\pi} \frac{ak}{2\pi r_0} \cos(2\pi ft - \frac{2\pi f}{c}(X'_r - r_0 \cos \theta)) d\theta ``$$

and insert:

$$-- I_1 = \int_0^{2\pi} \frac{ak}{2\pi r_0} \cos(2\pi ft - \frac{2\pi f}{c}(X'_r - r_0 \cos \theta)) d\theta --$$

Signed and Sealed this

Thirteenth Day of August, 1991

*Attest:*

HARRY F. MANBECK, JR.

*Attesting Officer*      *Commissioner of Patents and Trademarks*